United States Patent [19]

Peash

[11] 4,185,858
[45] Jan. 29, 1980

[54] SECONDARY SEAL FOR TUBING JOINED VIA V-BAND COUPLINGS

[75] Inventor: Douglas E. Peash, Enum Claw, Wash.

[73] Assignee: The United States of America as represented by the Secretary of the Air Force, Washington, D.C.

[21] Appl. No.: 920,867

[22] Filed: Jun. 28, 1978

[51] Int. Cl.² ............................................. F16L 23/04
[52] U.S. Cl. .................................... 285/367; 277/236; 285/DIG. 18
[58] Field of Search ....... 285/367, 366, 365, DIG. 18, 285/233, 234; 277/236

[56] References Cited

U.S. PATENT DOCUMENTS

| | | | |
|---|---|---|---|
| 1,863,122 | 6/1932 | Matthews | 285/367 X |
| 2,050,137 | 8/1936 | Walsh | 285/DIG. 18 X |
| 2,489,587 | 11/1949 | Rice | 285/367 |
| 3,235,293 | 2/1966 | Condon | 285/367 X |
| 3,464,722 | 9/1969 | Larkin | 285/367 |
| 3,563,571 | 2/1971 | Werra | 285/367 X |
| 3,762,746 | 10/1973 | Amada | 285/367 X |
| 3,822,075 | 7/1974 | Duncan | 285/367 |

FOREIGN PATENT DOCUMENTS

2638018  3/1977  Fed. Rep. of Germany ... 285/DIG. 18

*Primary Examiner*—Thomas F. Callaghan
*Attorney, Agent, or Firm*—Joseph E. Rusz; James S. Shannon; Casimer K. Salys

[57] ABSTRACT

A device for sealing the joint between ducts having sheet metal flanges mated with V-band couplings. Seal assemblies are interposed between the V-band coupling and the abutting duct flanges. As the V-band coupling is tightened to draw the ends of the duct flanges together the seal assembly is compressed, deforming the sealing material in contact with the duct flanges and effectuating a tight seal therebetween. A variety of seal assembly configurations are contemplated including those of continuous or segmented structure, those having compressible resilient materials or ductile metals as sealing materials, and those having a support band bonded to the sealing material for added structural rigidity.

2 Claims, 8 Drawing Figures

SECONDARY SEAL FOR TUBING JOINED VIA V-BAND COUPLINGS

RIGHTS OF THE GOVERNMENT

The invention described herein may be manufactured and used by or for the Government of the United States for all governmental purposes without the payment of any royalty.

BACKGROUND OF THE INVENTION (1) Field of the Invention

This invention relates to means for sealing the joint between sheet metal ducts having flanged ends that are pressed together by a V-band coupling.

(2) Description of the Prior Art

Sheet metal flange joints mated with V-band type couplings are used frequently in aircraft pneumatic duct systems due to their light weight, simple construction, and ease of installation. This is especially true when the pneumatic system is one in which high temperatures are experienced. For effective coupling with minimum leakage the joints depend upon the faying surfaces of the sheet metal flanges, thereby imposing the requirement that these surfaces be free from scratches and wrinkles, be flat within tolerances such as 0.005 inches, and have a surface roughness in the range of 32 TIR (total indicator reading). Furthermore, the adjoining ducts must be properly aligned, and the tee-bolt on the V-band coupling precisely torqued, to avoid deforming the joint.

If the mating is improper and the permissible leakage rate, typically about 0.01 scfm (standard cubic per minute) per inch of duct diameter, is exceeded the joint must be repaired. The initial installation of the ducts at the aircraft manufacturing facility is usually done with a higher degree of care and in the presence of greater scrutiny than can normally be expected during operational disassembly. As a result, the aircraft purchasers are often subjected to costly duct removal and flange rework procedures when the faying surfaces of mating flanges allow excess gas leakage after operational servicing and the leakage cannot be corrected by burnishing or recontouring of the flange faying surfaces.

Though a variety of sealing devices and techniques are known to those skilled in the relevant art, the applicant is not aware of a seal assembly of the type disclosed particularly suited for direct use with conventional V-band couplings and selectively capable of wide operating temperature ranges.

SUMMARY OF THE INVENTION

This invention discloses a replaceable seal assembly for use in joining duct ends having sheet metal flanges mated with V-band couplings. The use of such seal assemblies permits the joining of ducts having mating flanges which would otherwise require costly rework because of excessive leakage through defects in the faying surfaces.

The seal assemblies are in the form of continuous or overlapping segmented bands with a substantially rigid outer band dimensionally compatible with the interior of the V-band coupling, and an inner band, bonded to the outer band, consisting of a compressible sealing material. The compressible material of the seal assembly is driven into the joint between the duct flanges by the combined action of the flanges being compressibly mated as the V-band coupling is drawn tighter about the joint.

DESCRIPTION OF THE PREFERRED EMBODIMENT

Figure 4:
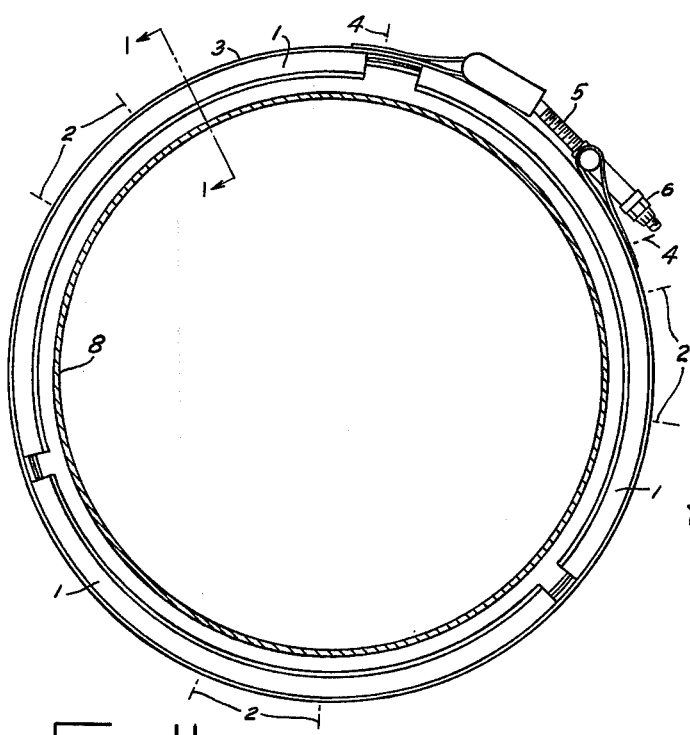
FIG. 4 is a side view of a conventional V-band coupling with seal installed on a duct joint.

A conventional V-band coupling is shown in FIG. 4. Flange segments 1 are spot welded at points 2 onto retaining band 3. The ends of retaining band 3 are looped back and spot welded at points 4. Tee-bolt 5 joins the end loops of band 3, permitting retaining band 3 and flange segments 1 to be radially contracted by tightening nut 6. In normal use the V-band coupling encircles the abutting ends of the sheet metal flanged ducts, drawing the abutting flange surfaces into a sealed relationship as nut 6 is torqued to the prescribed magnitude. If the ducts are aligned and the faying surfaces properly finished, the V-band coupling produces a quality mating of the duct ends.

Figure 1:
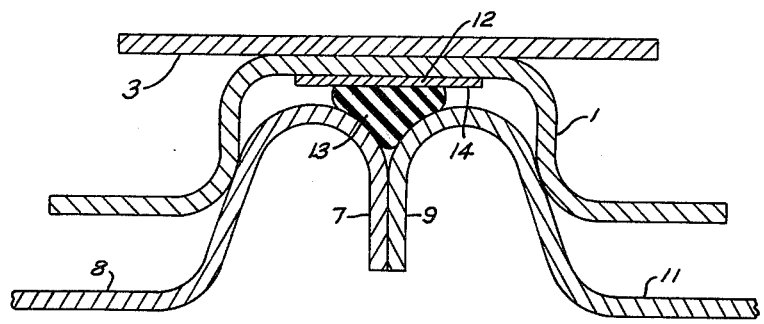
FIG. 1 is a cross-section of a seal assembly installed in a "large radius" type flange joint and retained with a V-band coupling, the section being taken at plane 1—1 of FIG. 4.

As was noted previously, imperfections in the faying surfaces introduced during post-manufacture servicing often cause leakage rates in excess of the acceptable limits. In response thereto, this invention teaches the use of a coupling improvement in the form of a seal assembly installed in the joint formed by the V-band coupling and the two duct flanges. Referring now to FIG. 1, which is a cross-section taken at plane 1—1 of FIG. 4, a conventional V-band coupling, consisting of flange 1 and retaining band 3, is shown mating flange 7 of left duct 8 with flange 9 of right duct 11. Sealing assembly 12, comprised of compressible material 13 bonded to support band 14, nests between abutting duct flanges 7 and 9, and is restrained in that relative orientation by flange 1 acting on support band 14. When tee-bolt 5 is properly torqued, compressible material 13 deforms at the surfaces in contact with duct flanges 7 and 9 to produce a tight seal. Further tightening of the V-band coupling accentuates the deformation of seal material 13, thereby compensating for nominal deformations in flanges 7 and 9.

Figure 2:
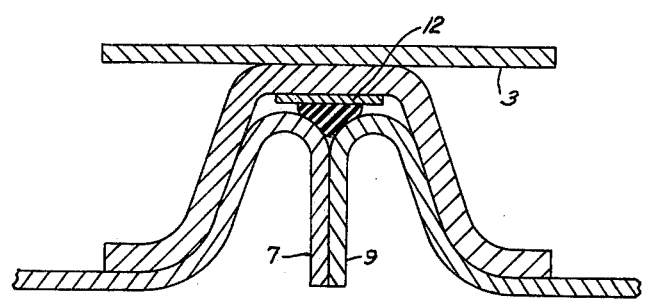
FIG. 2 shows the structure of FIG. 1 when used with a "low profile" type flange joint.

The seal assembly shown in FIG. 2 of the drawings contains another representative application for the invention. This structure is a variation generally known as a "low profile" type joint, in contrast to that of FIG. 1 which is generally characterized as a "large radius" type flange joint. Again, seal assembly 12 in FIG. 2 aligns with and seals abutting duct flanges 7 and 9.

FIG. 3 shows the cross-section of three typical seal assemblies. Their size varies with the duct diameter and flange structure, whereas the distinctions between materials used to fabricate the seal assemblies is dictated primarily by the temperature range over which the seal assemblies are to operate.

Figure 3A:
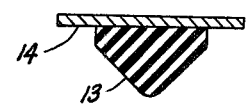
FIGS. 3a, 3b, and 3c show cross-sections of various representative seal assemblies.

Considered individually, the seal assembly shown in FIG. 3a has the structure formerly described in relation to the joints appearing in FIGS. 1 and 2. Compressible seal material 13 would likely consist of Teflon or silicon rubber, suitably bonded to support band 14 which itself is fabricated from a material such as corrosion resistant steel or titanium. These combinations of materials are intended for an operating environment of $-65°$ F. to $+500°$ F.

Figure 3B:

For operating temperatures of $-65°$ F. to $+1200°$ F. seal assembly 16, as appears in FIG. 3b, is a better suited candidate. The seal and supporting band form a single structure which is fabricated from a ductile material such as annealed copper. The jagged circumferential ridges at the two seal faces 17 facilitate deformation to improve sealing.

Figure 3C:
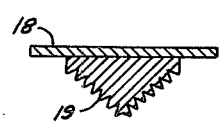

To operate at even higher temperatures the seal assembly structure should conform to the cross-section shown in FIG. 3c. Though sealing element 19 continues to be made from a material such as annealed copper, support band 18 now employs stronger materials such as corrosion resistant steel or Inconel. Again, the structure exhibits jagged ridges extending circumferentially at the sealing surfaces to improve the contact with the duct flanges.

Figure 5:
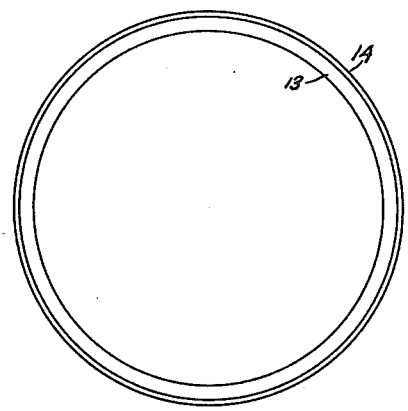
FIG. 5 shows a seal assembly having a continuous support band.

Further refinements in the structure of the seal assembly are contemplated. For example, the seal assemblies described above are in the shape of continuous rings (see FIG. 5) where the inside diameter of supporting band 14 is typically 0.02 inches larger than the outside diameter of the duct flanges. If the duct flanges cannot be separated during servicing, or the contraction of the V-band onto the duct flanges is significant, the use of a single structure seal assembly is not suitable for the application. In such cases a segmented seal assembly of the form partially shown in FIG. 6 is used.

Figure 6:
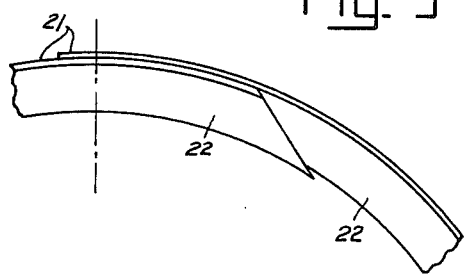
FIG. 6 shows the overlapping portion of a seal assembly having a segmented support band.

The overlapping portion of a segmented seal assembly appears in FIG. 6, magnified for purposes of definition. The segmented seal is cut sufficiently long to permit the ends to overlap. The seal assembly ends are finished as shown in FIG. 6, with sealing material 22 removed from that portion of support band 21 where the band overlaps, while the sealing material ends are cut to form a tapered end joint of the form shown. Though the segmented seal assembly has attributes as to applicability it does exact a penalty in leakage, since the sealing is generally not as effective as that obtained with a continuous seal assembly.

I claim:

1. In a pneumatic duct system joint having the duct ends to be mated flanged so as to flare and then turn radially inward at their abutting faces forming curved segments between the flare and the abutting faces, and having a V-band coupling engaging the flares of the duct ends and compressing said abutting faces, the improvement comprising:

an annular sealing assembly having a metallic support band with a ductile metallic sealing material bonded thereto and extending radially inward therefrom; and where said metallic sealing material has multiple ridges, on the surfaces making sealing contact with the inwardly curving segments of the duct flanges, which ridges extend circumferentially around the material's periphery and deform during the mating process.

2. The improvement recited in claim 1, wherein, said sealing assembly is segmented so as to have fully overlap of the support band for a portion of the assembly, and said sealing material joint is in the form of an overlapping radially directed taper.

* * * * *